(12) United States Patent
Tai

(10) Patent No.: US 7,040,603 B1
(45) Date of Patent: May 9, 2006

(54) LEVELER INTERLOCKING BLOCKS

(76) Inventor: Lo Yun Tai, E9-E16, 9/F., Phase 2, Tsing Yi Industrial Centre, Lot 65 Tsing Yi Island, N.T., Hong Kong (HK)

( * ) Notice: Subject to any disclaimer, the term of this patent is extended or adjusted under 35 U.S.C. 154(b) by 0 days.

(21) Appl. No.: 10/431,040

(22) Filed: May 8, 2003

(51) Int. Cl.
*E02C 3/00* (2006.01)

(52) U.S. Cl. ......................................................... 254/88
(58) Field of Classification Search .................. 254/88; 14/71.1; 152/213 R; 248/352; 269/296
See application file for complete search history.

(56) References Cited

U.S. PATENT DOCUMENTS

| | | | | |
|---|---|---|---|---|
| 4,819,910 A | * | 4/1989 | Johnston | 254/88 |
| 5,458,315 A | * | 10/1995 | Blatz et al. | 254/88 |
| 5,863,026 A | * | 1/1999 | Gano et al. | 254/88 |
| D426,933 S | | 6/2000 | Redfern | |
| 6,135,420 A | * | 10/2000 | Johnston et al. | 254/88 |
| 2003/0146422 A1 | * | 8/2003 | Funk et al. | 254/88 |

* cited by examiner

*Primary Examiner*—Lee D. Wilson

(57) ABSTRACT

The present invention is a set of at least three interlocking blocks where two of the blocks are set on a ground surface and are connected at their top surfaces by a particular configuration of the underside of the third block. Four square and raised parts with four key recesses are formed on the top side of the entirely plastic and unitarily molded block to mate with a cavity and four flanged posts on the underside of another identical block. The critical part of this invention is providing four key recesses in the raised part of the block into which interlock the flanged posts of the underside of the block.

11 Claims, 5 Drawing Sheets

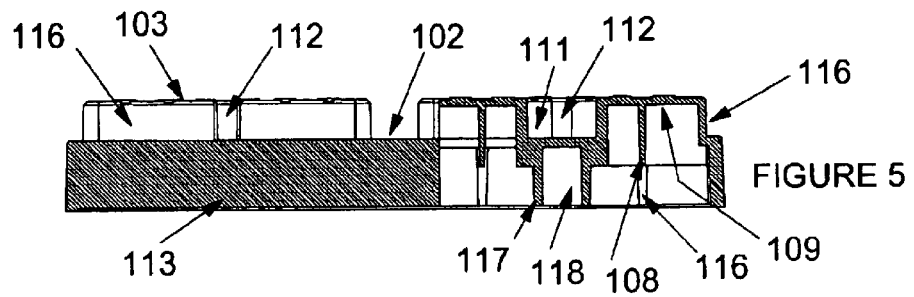
FIGURE 5
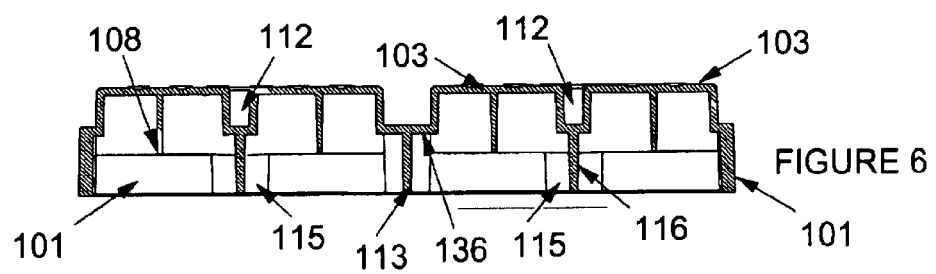
FIGURE 6
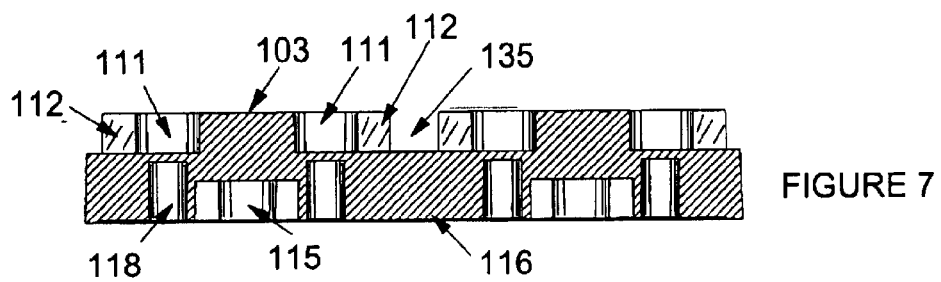
FIGURE 7
FIGURE 8
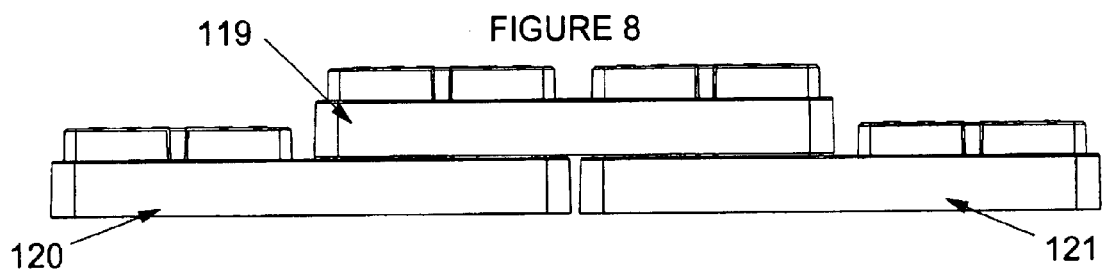
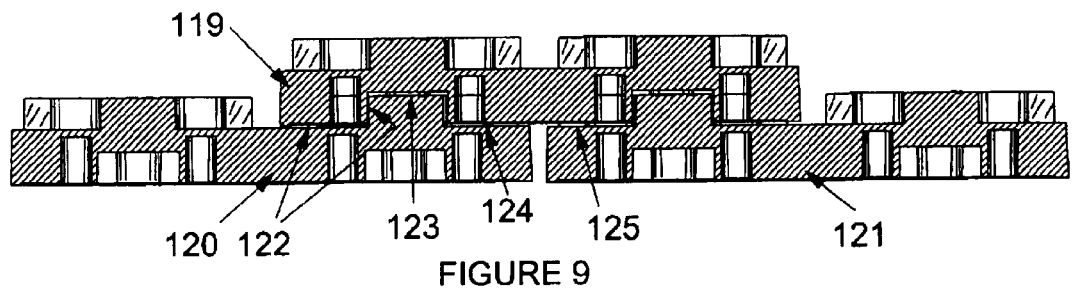
FIGURE 9

LEVELER INTERLOCKING BLOCKS

BACKGROUND OF THE INVENTION

The present invention relates to plastic interlocking blocks used to level recreational vehicles and travel trailers.

The prior art describes several forms of interlocking pieces connected so that trucks and recreational vehicles can drive on to them and be leveled at an uneven site. U.S. Pat. No. D426,933 shows one of a set of at least three interlocking blocks that are set up with two side by side and the third placed on top of halves of the bottom two to lock the three together. It has been found that this form of interlocking block suffers from substantial (over 20%) breakage in actual use with loaded trucks and recreational vehicles. The breakage is due to the particular strains placed on the blocks. A tire must be able to drive up a stepped ramp formed by the blocks and then come to rest preferably at the top of the third or top block or at any place on the stepped ramp. The strain that this makes on plastic pieces has been found to be unique in engineering of plastic parts.

U.S. Pat. No. 5,458,315 attempts to solve this breakage problem by using a heavily reinforced skeleton of brace plates. While in some ways preferable over the device of U.S. Pat. No. D426,933, the polygonal form of the raised part to interlock with a cavity in another block allows substantial lateral twisting that is not allowed with the square raised part shown in U.S. Pat. No. D426,933.

There is a need for a device that would combine the non-rotation form of a leveling block with a non-breakable form.

SUMMARY OF THE INVENTION

The present invention is a set of at least three interlocking blocks where two of the blocks are set on a ground surface and are connected at their top surfaces by a particular configuration of the underside of the third block. Four square and raised parts with four key recesses are formed on the top side of the entirely plastic and unitarily molded block to mate with a cavity and four flanged posts on the underside of another identical block. The critical part of this invention is providing four key recesses in the raised part of the block into which interlock the flanged posts of the underside of the block.

The invention block eliminates the breakage inherent with that of the block shown in U.S. Pat. No. D426,933.

BRIEF DESCRIPTION OF THE DRAWINGS

FIG. 5 is a section 203 view of FIGS. 3 and 4.

FIG. 6 is a section 201 view of FIG. 3.

FIG. 7 is a section 202 view of FIG. 3.

FIG. 8 is a side view of three invention blocks stacked to form a stepped ramp for leveling a vehicle.

FIG. 9 is the view of FIG. 8 with cutaway views of FIG. 7 for the invention blocks.

DETAILED DESCRIPTION OF THE INVENTION

Figure 1:
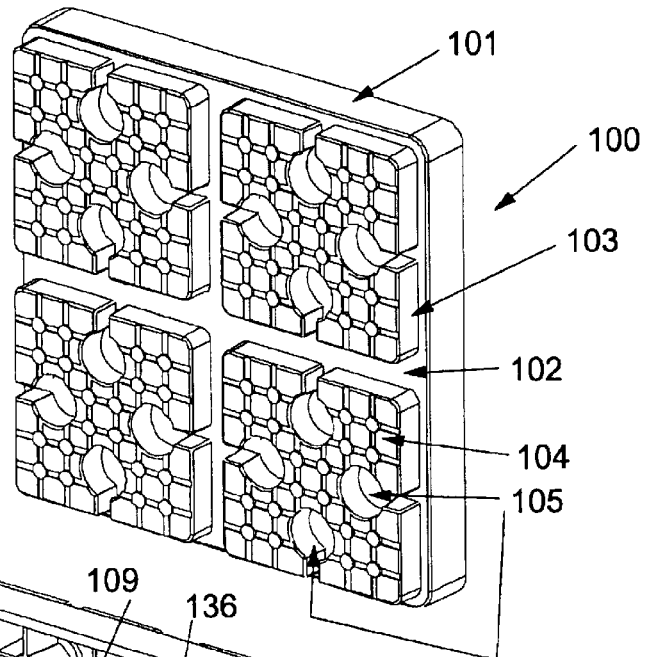
FIG. 1 is a front perspective view of the invention block.
Figure 2:
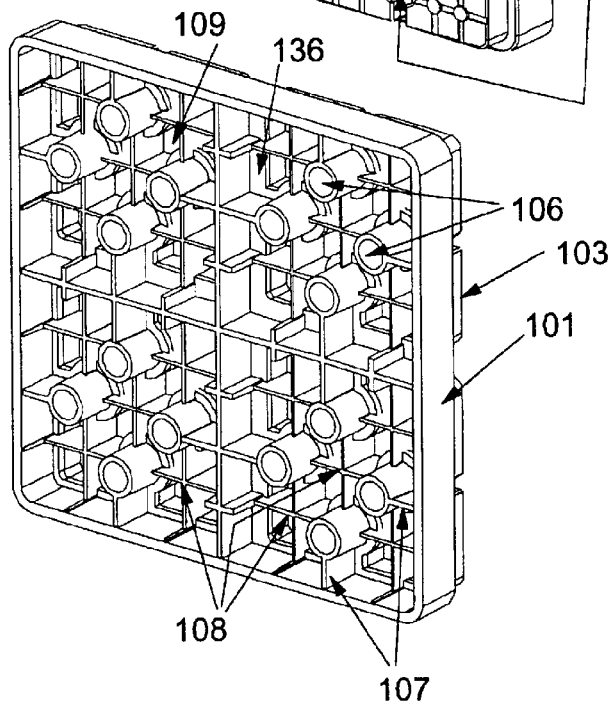
FIG. 2 is a rear perspective view of the invention block.
Figure 3:
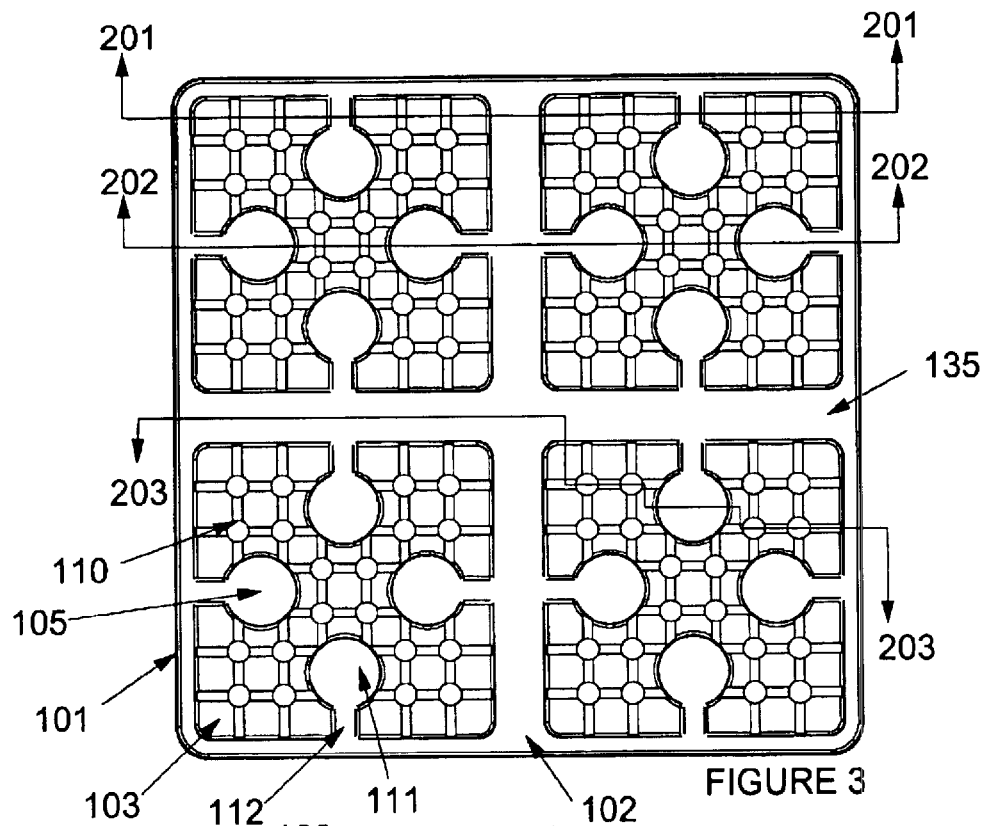
FIG. 3 is a top view of the invention block.

The invention is now discussed with reference to the figures

All of the invention blocks are identical. FIGS. 1 to 4 show front and back views of the invention block 100. Block 100 is square with a main side wall 101 and generally covered across a top of the side wall 101 with a base plate 102 and four identical and substantially square raised parts 103. A side wall 116 (as in FIG. 5) defines the height of raised parts 103 that are in turn covered with a raised part plate 104. Each of the four sides of the square raised parts 103 comprises a key recess 105. The four key recesses each receive a flanged post 106 on the underside of block 100 when one block 100 is interlocked with another block 100 as described below. The underside of block 100 comprises 16 flanged posts 106 connected by an open structure of flanges 107 and 108 extending to different distances from the undersides 136 and 109 respectively of plates 102 and 104. The different distances are adapted to cause undersides 136 and 109 to contact and be supported from an underlying block 100's plates 102 and 104.

Raised parts 103 are separated by a uniform distance 135, which is substantially less than the width of flanges 113 (that bisect the length and width of base plate 102). When flanged posts 106 are inserted into recesses 105, there is substantial clearance between the lateral surfaces of the flanged posts 106 and the side walls of recesses 105. In contrast, when one block 100 is interlocked to another block 100, a part of the inside surfaces of the main side wall 101 of one block are very closely associated with or contact part of the outside surfaces of the raised part side walls 116. The loose fit of the flanges 113 and flanged posts 106 of one block with respectively the recesses 105 and distances 135 of another block lets the user quickly and easily connect one block with another. The tight fit of the raised part of one block with the main side walls of another block provides all the necessary secure connection needed to provide a user with a stable stepped ramp according to the invention. Prior art devices have not provided the elimination of breakage with the relatively tight connection of the invention blocks. The polygonal raised parts of the blocks of U.S. Pat. No. 5,458,315 are somewhat more subject to twisting disengagement than the invention blocks. It is well known in the art that leveler blocks are many times used on very uneven ground with rocks and holes. When an individual block is placed on that uneven surface and driven onto with a heavy vehicle, a plastic block necessarily contorts. The box structure of the raised parts of the invention block resists contortion between the interlocking portion of the blocks better than the blocks of U.S. Pat. No. 5,458,315.

With reference to FIGS. 3 and 5 to 7, key recesses 105 are shown to comprise an a slot 112 that opens to a lateral side of each side of raised part 103 and opens at another end to post hole 111. Flanged posts 106 comprise a hollow cylinder 115 extending to a flange 116 that continues to connect with another flange 116 or to the inside surface of the main side wall 102. Flange 116 is inserted into slot 112 and cylinder 115 is inserted into post hole 111 when one block is interlocked with another block. Cylinders 115 are comprised of a wall part 117 and bore 118.

An underside cavity 114 (shown in FIG. 4) is defined by a part of inside surfaces of main side wall 102 and adjacent parts of flanges 113. Within a cavity 114 are four flanged posts 106 and flanges 107 and 108 for interlocking with a single raised part 103. FIG. 8 shows that block 119 interlocks blocks 120 and 121. This interlocking is accomplished by inserting two raised parts 103 of block 120 into two overlaying cavities 114 of block 119 and similarly inserting two raised parts of block 121 into two overlaying cavities 114 of block 119. The interlocking fit, while easily disassembled without having to pry the blocks apart, is extremely secure when driven upon by a heavy vehicle.

FIG. 9 shows that flanged posts of block 119 and the floor and side walls of key recesses of block 120 contact to form support interfaces 122 and 124 and that a top surface of a raised part of block 120 and shorter underside flanges of block 119 contact to form support interface 123. In addition, block 119 extends from block 120 to 121 and forms similar support interfaces, such as support interface 125 being similar to that of support interface 122.

Figure 10:
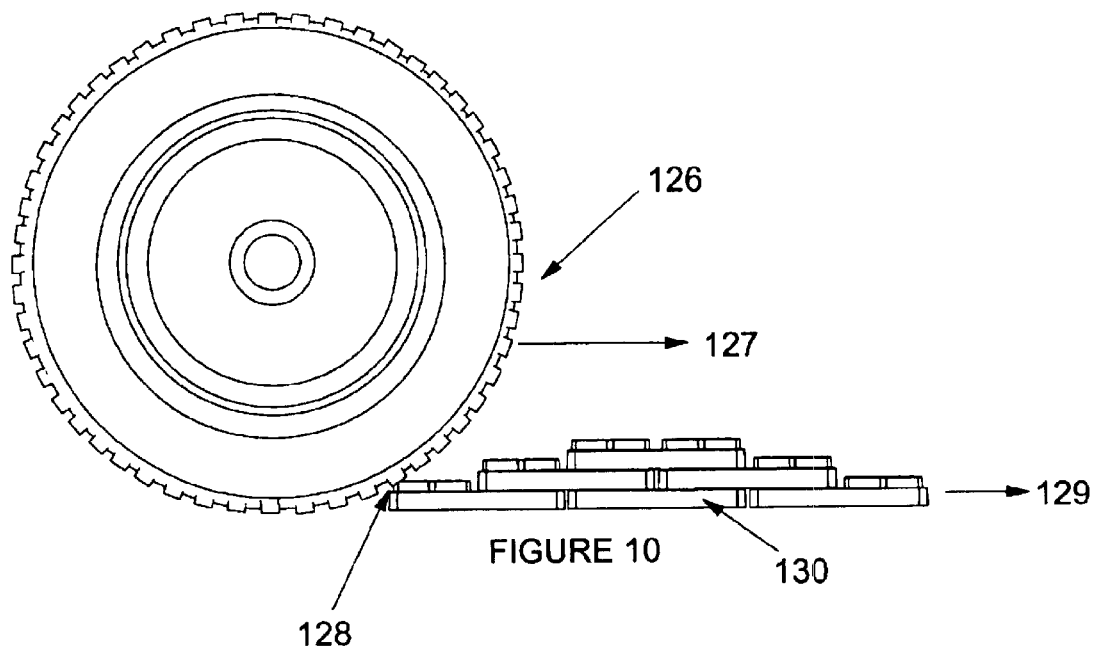
FIG. 10 is the stepped ramp of FIG. 8 with a tire about to roll up the ramp.
Figure 11:
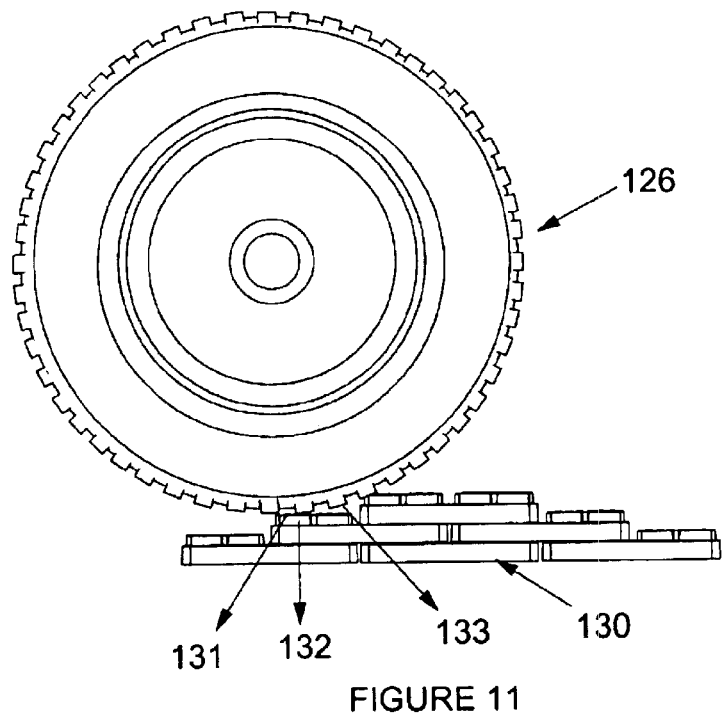
FIG. 11 is the stepped ramp of FIG. 8 with a tire rolled about halfway up the ramp to show unique forces on the invention blocks.

FIGS. 10 and 11 shows six invention blocks interlocked in a stepped ramp 130 so that a heavy vehicle may drive up them to be leveled. The vehicle is not shown, but its effects are represented by tire 126. FIG. 10 shows that at first contact 128 of the tire 126 and ramp 130, there is a tendency for the ramp 130 to be pushed in direction 129 and slipping away from the surface of tire 126. The height of the main side walls are adapted to be low enough so that this does not happen, typically making the height of side walls 102 not higher than about 3 inches. To reduce the number of blocks required to form the stepped ramp, it is preferable to make the height of main side walls as high as possible.

FIG. 11 shows that the vehicle represented by tire 126 produces forces 131 to 133 on ramp 130. Forces 131 tend to break down the main side walls of the middle layer block shown with the force arrow passing through it, along with a middle part of the block at the ground level. The combination of the flanged posts and key recesses allow substantial flexion of the main side walls and base plate of the blocks 119 and 120 while providing "stop" supports at critical flexion limits for those flexing parts. This is true of the downward force 132 and forward and downward force 133.

Figure 4:
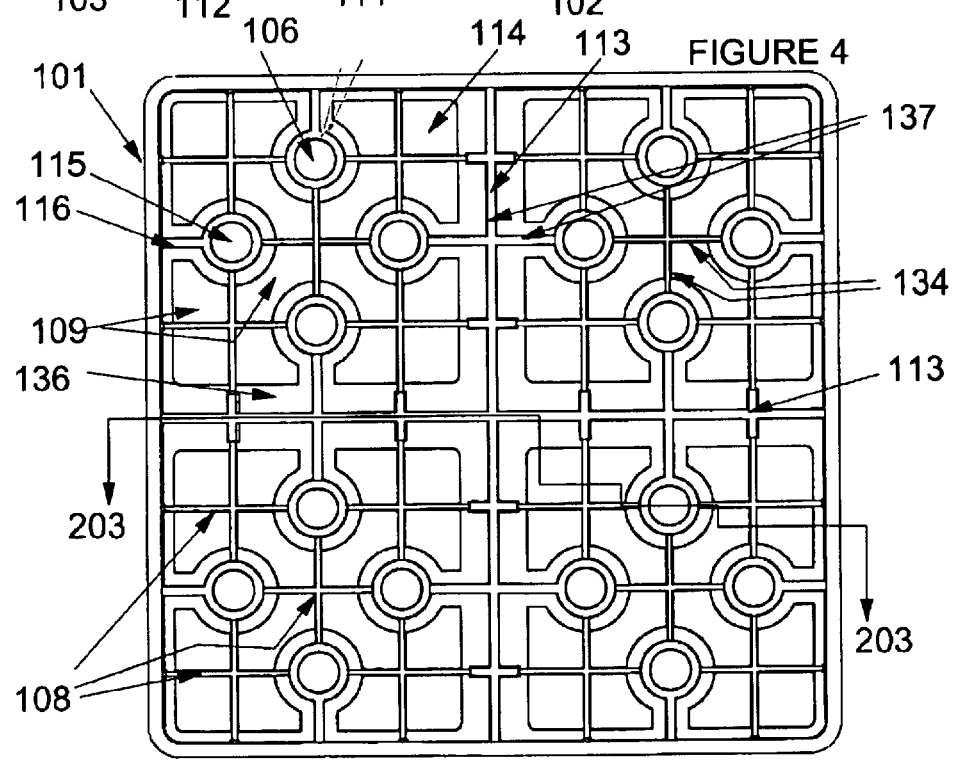
FIG. 4 is a bottom view of the invention block.
Figure 12:
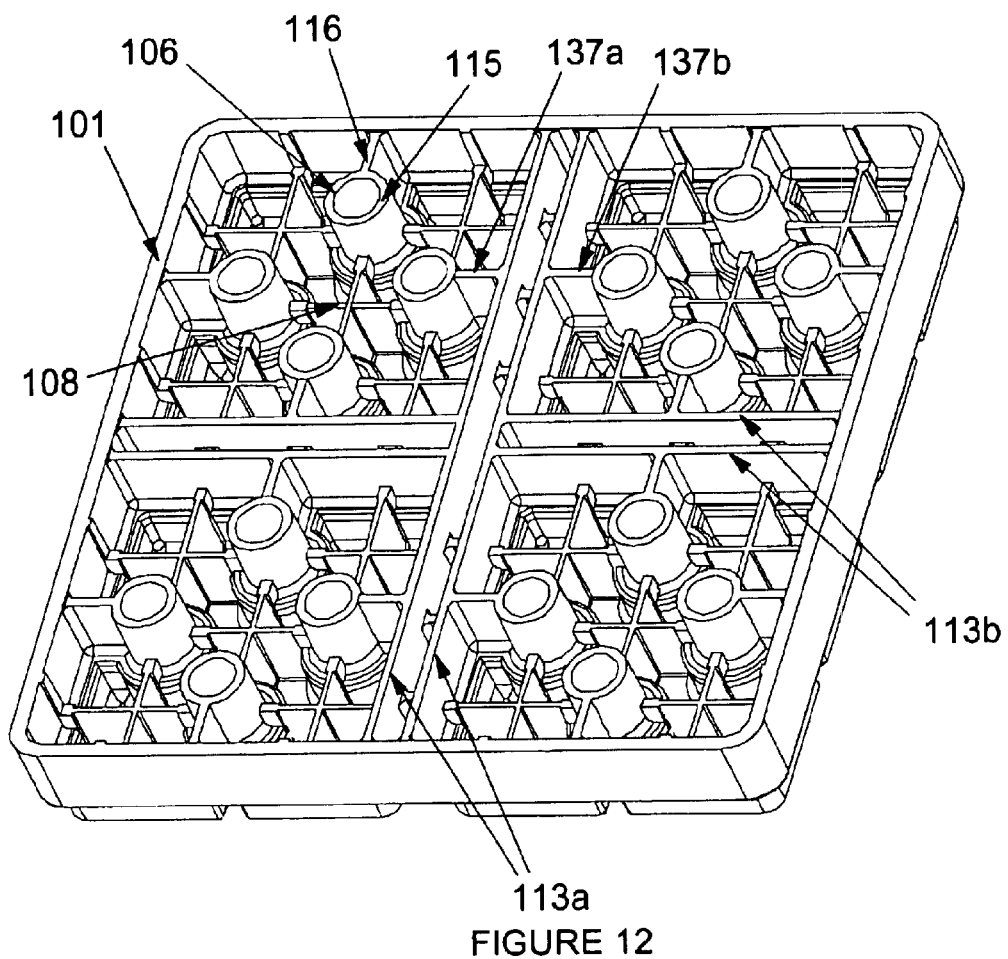
FIG. 12 is a view similar to that of FIG. 2, showing a reinforced T-section of the underside of the invention blocks.

FIG. 12 shows that section 113 of FIG. 4 have been doubled to form sections 113a and 113b. This is a preferred form where especially heavy vehicles will use the invention blocks. Section s 113a and 113b provide exceptional resistance to twisting stress that leads to block failure.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A square leveler block formed in a single and unitary molding step of a polymer resin with main side walls defining an outer square shape, the main side walls sealingly capped by a base plate and four square raised parts comprising:
   (a) an underside cavity substantially immediately beneath each of the raised parts, the underside cavity comprising four flanged posts, where each of the four flanged posts are adapted to interlock with a key recess defined in a raised part of another identical leveler block when that raised part of the other leveler block is located within the underside cavity;
   (b) the raised parts have raised part side walls sealingly capped with a top plate and the raised part side walls are aligned with their sides parallel with the main side walls; and
   (c) each raised part defines four key recesses, one key recess extending in from each of the four raised part sidewalls.

2. The block of claim 1 wherein each key recess comprise a slot extending from an opening in the raised part side wall to a cylindrical post hole having a substantially greater diameter that a side to side width of the slot.

3. The block of claim 2 wherein each flanged post comprises a cylindrical post extending from an underside of the top surface to a length greater than a height of the raised part side walls so that a free end of the cylindrical post is supported at a floor of the post hole when one identical leveler block is interlocked with another leveler block.

4. The block of claim 3 wherein a post flange extends, in a downward direction, from the underside of top surface to a distance equal to that of the cylindrical post and, in a lateral position, from an outside surface of the cylindrical post to either an inside surface of the main side wall or to another post flange.

5. The block of claim 4 wherein each post flange is adapted to be supported at a floor of a slot when one identical leveler block is interlocked with another leveler block.

6. A leveler block group formed in a single and unitary molding step of a polymer resin comprising:
   (a) main side walls defining an outer rectangular shape, the main side walls sealingly capped by a base plate, from which base plate extend four square raised parts with underside cavities; and
   (b) the underside cavity comprising a set of flanged posts, where each of the flanged posts are adapted to interlock with a key recess defined in a raised part of another identical leveler block when that raised part of the other leveler block is located within the underside cavity;
   (c) the raised parts have four raised part side walls sealingly capped with a top plate and the raised part side walls are aligned with their sides parallel with the main side walls; and
   (d) each raised part defines four key recesses, one key recess extending in from each of the four raised part sidewalls.

7. The block group of claim 6 wherein each key recess comprise a slot extending from an opening in the raised part side wall to a cylindrical post hole having a substantially greater diameter that a side to side width of the slot.

8. The block group of claim 7 wherein each flanged post comprises a cylindrical post extending from an underside of the top surface to a length greater than a height of the raised part side walls so that a free end of the cylindrical post is supported at a floor of the post hole when one identical leveler block is interlocked with another leveler block.

9. The block group of claim 8 wherein a post flange extends, in a downward direction, from the underside of top surface to a distance equal to that of the cylindrical post and, in a lateral position, from an outside surface of the cylindrical post to either an inside surface of the main side wall or to another post flange.

10. The block group of claim 9 wherein each post flange is adapted to be supported at a floor of a slot when one identical leveler block is interlocked with another leveler block.

11. The block group of claim 10 wherein support flanges of a first leveler block extend from the underside of the base plate to a distance adapted to support the base plate on a top surface of another identical leveler block when the two leveler blocks are interlocked.

* * * * *